Figure 1:
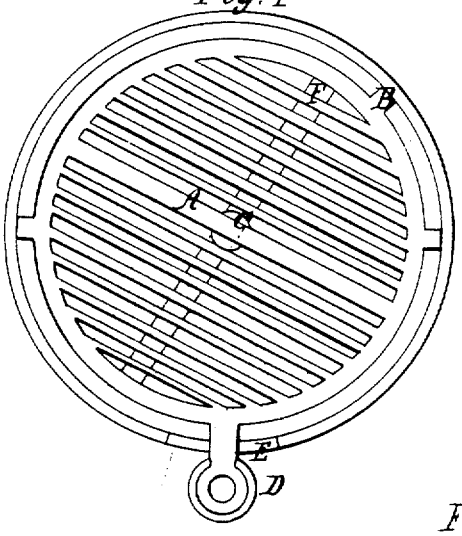
Figure 2:
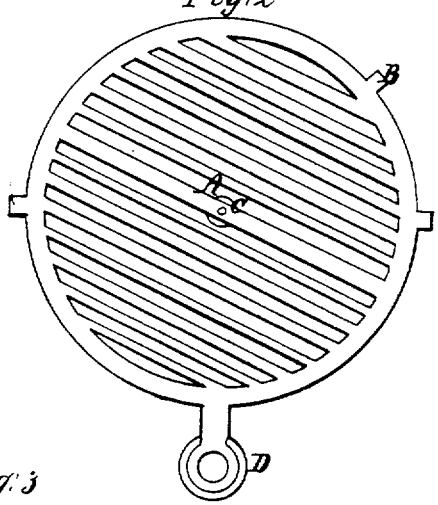
Figure 3:
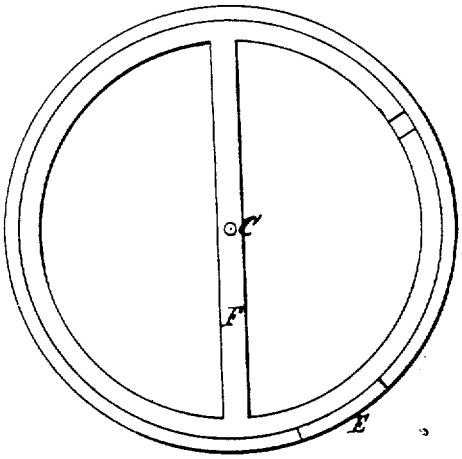

BEST AVAILABLE COPY

J. L. Mott,

Grate.

9,166 ✗ Patented Oct. 14. 1835.

N. PETERS, PHOTO-LITHOGRAPHER, WASHINGTON, D. C.

Oct. 14 1835 97

9166X

Jordan L. Mott of the City of New York
Letters Patent

The Schedule referred to in these Letters Patent and making part of the same containing a description in the words of the said Jordan L. Mott himself of his Improvement in the construction of grates or grate bars for Stoves or Furnaces To all whom it may concern Be it known that I Jordan L. Mott of the City of New York have invent-ed an improved mode of constructing grates or grate bars for Stoves or Furna-ces by means of which they are rendered more economical and the vibrating and tilting motions are obtained by a very simple arrangement of the parts, And I do hereby declare the following to be a full and exact description thereof I cast a circular ring or hoop that is to receive the Grate and that has a projecting flanch on the inside upon which projecting pieces upon the edge of the grate rest. A shank forming one of the pins or gudgeons upon which the grate tilts, passes through an opening or slot left in the rim for that purpose, and has a knob or handle by which the vibrating and tilting may be effected. This slot is covered on the outside by a curved sliding piece of cast iron which prevents dust from passing through. The grate it-self is cast with — a hole in its centre to receive a pin upon which it vi-brates horizontally which pin is sustained by a cross bar cast upon and with the hoop. The back gudgeon which form one of the bearings up-on the flanch before mentioned is not diametrically opposite to the shank in front but is placed or moved so far out of a line with it as to cause the grate when tilted to lift off the centre pin and to clear the cross bar, or a projecting piece may extend from the flanch out of the diametrical line of the shank upon which the edge of the grate may rest when tilted, but this is not pre-ferred as the grate will not so readily fall on the centre pin when re-turned to its place as it will do if properly adjusted when the gudge-on is on the grate. The pin may be cast upon the grate and a hole to

9166X to receive it left in the cross bar, the former method however is deem-
ed the best  When the grate is brought into the proper position for tilting
one of the projecting pieces on the grate passes through a notch in the flanch,
I usually make the upper side of the grate convex and curve the cross
bar to correspond therewith as shown in the drawing deposited in the
Patent Office. But it may if preferred be made flat and the bar
straight. I do not claim the vibrating and tilting motions as such.
But what I do claim as my invention and improvement is the combi-
nation of the vibrating and tilting motions with the back excentric wedge
or projecting piece by which the grate may be lifted off and turned on
to the centre pin and clear the cross bar by merely turning the shank.
I also claim the particular combination of the respective parts as
above described by which the grate and its bearings are delivered from
the moulds in casting ready for action without any filing or other fit-
ting or the addition of any sliding bar pin or other appendage the op-
erating parts consisting only of the grate, the ring or hoop and the cover
for the opening or slot Gordon L. Mott Exd. Witnesses
W.H. Peter Erbon Jr
Seaman Weeks October 14. 1835.)  [illegible]

(Drawing.)